United States Patent [19]

Fishfader

[11] 4,283,942
[45] Aug. 18, 1981

[54] LOAD MEASURING DEVICE

[76] Inventor: Stanley S. Fishfader, 5868 Compass Dr., Los Angeles, Calif. 90045

[21] Appl. No.: 42,515

[22] Filed: May 25, 1979

[51] Int. Cl.³ .......................... G01L 5/00; G01L 5/10
[52] U.S. Cl. ............................. 73/862.65; 73/862.39
[58] Field of Search ............................ 73/141 A, 143

[56] References Cited
U.S. PATENT DOCUMENTS

| 2,453,551 | 11/1948 | Statham | 73/141 A X |
| 3,486,369 | 12/1969 | Korzilius | 73/141 A X |

FOREIGN PATENT DOCUMENTS

| 653012 | 3/1965 | Belgium | 73/141 A |
| 942377 | 11/1963 | United Kingdom | 73/141 A |
| 390388 | 11/1973 | U.S.S.R. | 73/143 |

Primary Examiner—Charles A. Ruehl
Attorney, Agent, or Firm—Charles H. Schwartz; Ellsworth R. Roston

[57] ABSTRACT

A load measuring device for use with a link formed as a loop and with the link having end portions for receiving a load on the link along a first axis, including a load cell for mounting across the link and within the loop and along a second axis substantially perpendicular to the first axis for providing an indirect measurement of the load on the link along the first axis in accordance with the force on the load cell along the second axis, the load cell including means responsive to the force on the load cell along the second axis for producing an output signal in accordance with the force on the load cell, and indicator means responsive to the output signal from the means included in the load cell for providing an output indication representative of the load on the link along the first axis.

10 Claims, 4 Drawing Figures

U.S. Patent  Aug. 18, 1981  4,283,942
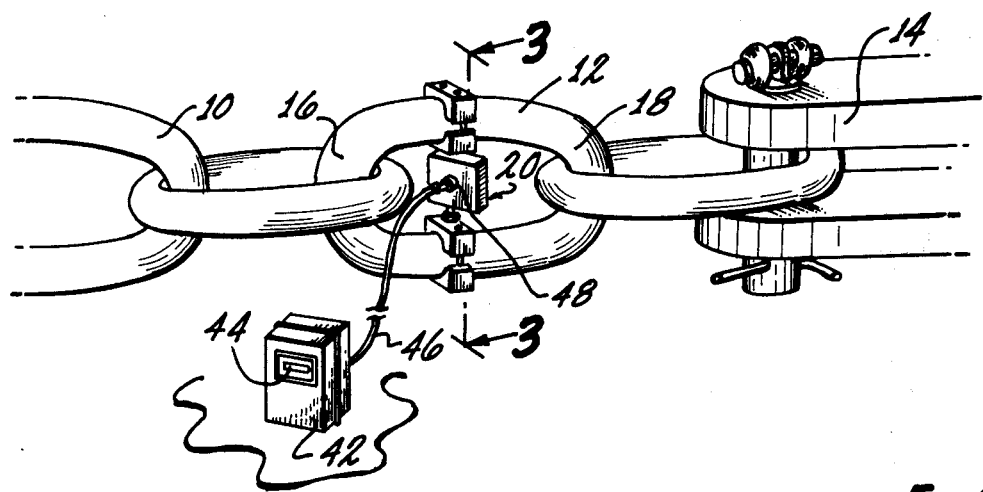
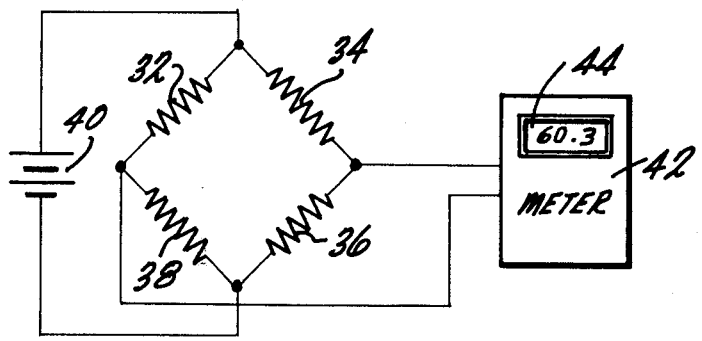
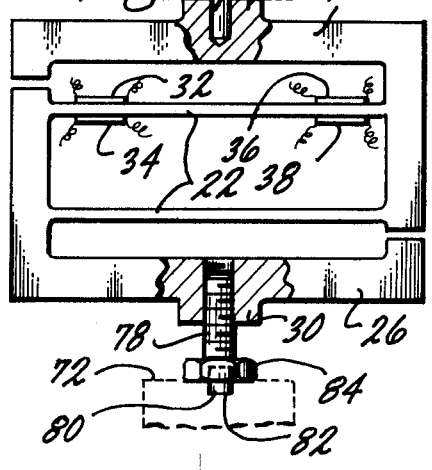
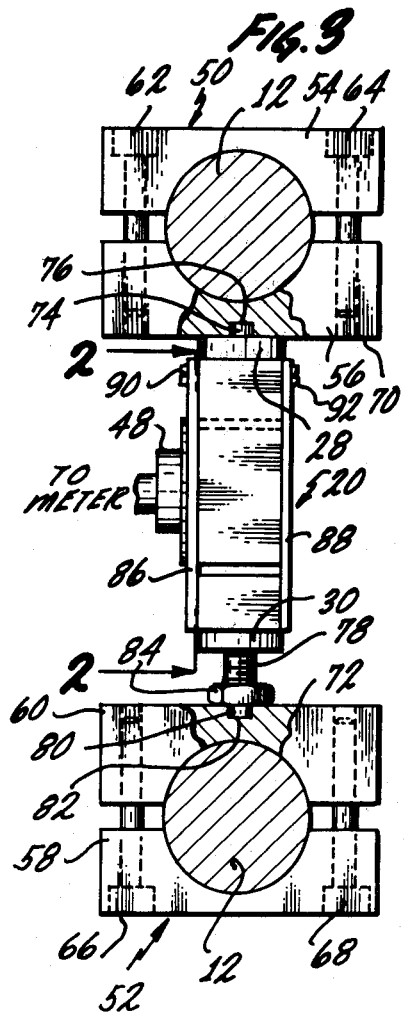

LOAD MEASURING DEVICE

The present invention is directed to a load measuring device for providing for the measurement of relatively high loads. The measuring device of the present invention provides for the measurement indirectly and may be smaller and more compact than prior art devices.

The load measuring device of the present invention is used in combination with a chain link and may be used to provide for the measurement of the load to which the ends of the link are subjected. The load measuring device of the present invention may therefore be used to measure the load on an individual link, which link is part of an existing chain structure and with the entire chain subjected to the load being measured. Alternatively, the present invention may be used to provide for the measurements of the load at the ends of the link but with the link being specially inserted in line with the load to be measured. The link may be of a standard type or may be specially designed to operate with the measuring device.

The load measuring device of the present invention provides for the measurement of the load on the ends of the link using an indirect method of measurement. Specifically, the load measuring device is located across an open portion of the link away from the ends of the link which receive the load. As the link receives the load at its ends, the load measuring device of the present invention is compressed. The compression to which the load measuring device is subjected is proportional to the load at the ends of the link.

Generally the link is subjected to a load which is a small fraction of the maximum rated load for the link. In this way the metal in the link is within its elastic range so that the change in dimensions of the link in response to the load is proportional to the load. As indicated above, the link may be a standard link which is part of a line subject to the load being measured. Alternately, the link may be added to the line which is subject to the load so as to provide for the measurement of the load. In addition, the link may be specially formed to operate with the measuring device of the present invention to thereby provide for the measurement of a load.

in the present application, the load measuring device provides for the measurement of the load at the ends of the link and in accordance with the measurements made by the load measuring device located across the open part of the link. Typically, the load on the link is along a first axis whereas the load on the load measuring device is along a second axis substantially perpendicular to the first axis for the load on the link. This provides for an indirect measurement of load as opposed to the prior art devices which provide for a direct measurement of load.

The measurement of the load by the prior art devices is normally along the same axis as that for the load being measured. Since the prior art devices provide for the measurement of the load along the same axis as the load, the prior art devices must be capable of withstanding the full force of the load being measured. Therefore, the prior art devices must be relatively robust and are often quite large and heavy. In the present invention, since the measurement is indirect, the load measuring device does not have to have the same degree of strength and may be accordingly smaller in size and more compact.

The load measuring device of the present invention also has the advantage of being able to be relatively portable so that it may be used to make measurements of loads in situ so as to allow the load measuring device of the present inventions an even greater flexibility in providing for the desired measurement of load.

A clearer understanding of the load measuring device of the present invention will be had with reference to the following description and drawings wherein FIG. 1 illustrates the load measuring device of the present invention located within a link in a chain;

FIG. 2 is a front view of the load measuring device with the cover removed and taken along lines 2—2 of FIG. 3;

FIG. 3 is a cross-sectional view of the load measuring device in the link in the chain taken along the lines 3—3 of FIG. 1; and FIG. 4 illustrates a bridge circuit for providing for an output indication of the load being measured.

In FIG. 1 a chain 10 is shown to be composed of a plurality of links and with a particular link 12 used for providing for the measurement of the load on the chain. A coupler 14 is connected to one end of the chain 10 and a similar coupler may be connected to the other end and with the load on the chain 10 in accordance with the load on the couplers 14. It is to be appreciated that although the load measurement device of FIG. 1 is shown in use with a chain 10 having a number of links, the measurement may actually be made using only a single link, such as the link 12, and with this link being either normally a part of the load bearing line or specially incorporated in the load bearing line. Also the link 12 may be specifically designed just to provide for load measuring purposes.

In any of the above cases, the link 12 receives the load at its opposite ends 16 and 18. In the specific example shown in FIG. 1, the load on the link 12 is coupled to this link 12 by the adjacent links and the load at the ends 16 and 18 of the link 12 should be uniform at both ends so as to provide for the proper operation of the load measuring device.

With reference to FIG. 2, it can be seen that the load measuring device includes a load cell 20, which load cell is formed with a pair of interior beams 22. Oppositely positioned cantilevered members 24 and 26 provide for strain in the beams 22 in accordance with the load applied to center portions 28 and 30 of the canteliver members 24 and 26. In the particular example of the load measuring device of the present invention only one of the beams 22 is used to provide for measurements of load. However, it is to be appreciated that either one or both of the beams 22 may be used to provide for the measurement.

The actual measurement of load is provided by a plurality of strain gauges 32 through 38 mounted at opposite ends and opposite sides of one of the beams 22. As shown in FIG. 4, the strain gauges 32 through 38 are connected in a bridge circuit and with a source of voltage of 40 supplying power across one arm of the bridge. The output reading is taken across the other arm of the bridge and is supplied to a meter 42 which provides for digital output readout 44 of the load on the link 12. An electrical cable 46 supplies the power to and receives the output signals from the bridge. A connector 48 located on the load cell 20 interconnects the cable to the bridge. It is to be appreciated that various auxiliary calibration resistors and zeroing resistors may be used to provide for the proper operation of the bridge circuit but such devices are commonly known and form no part of the present invention.

In order to insure for the proper transmittal of the load on the ends 16 and 18 of the link 12 across the load cell 20 and in a direction perpendicular to the direction of the load on the link 12, mounting couplers 50 and 52 are used. Each mounting coupler includes two half shells such as shells 54 and 56 of couplers 50 and 58 and 60 of coupler 52. Each half shell has an internal curved configuration to match the external configuration of the link 12. The half shells are held together through the use of bolts 62 through 68 which pass through one half shell and engage threads in the other half shell.

As can be seen in FIG. 3, the couplers 50 and 52 are mounted around the outside surface of the link 12 and provide for accurate inside surfaces 70 and 72 between which the load cell 20 may be mounted. The use of the couplers 50 and 52 eliminates problems of mounting the load cells directly across the middle portion of the link 12 and compensates for any irregularities in the outer surfaces of the link 12.

The load cell 20 includes a pin member 74 to be received within an opening 76 in the half-shell 56 of the coupler 50. The pin member 74 and opening 76 act as a guide to insure the proper positioning of the load cell 20 at its one end. The other end of the load cell 20 includes a screw member 78 having a pin portion 80, which pin portion 80 is received in an opening 82 in the half-shell 60 of the coupler 52. A nut member 84 is threaded onto the screw member 78. The pin portion 80 and the opening 82 also serve as a guide to properly position the other end of the load cell. The nut member 84 may be adjusted to insure that the load cell is accurately positioned across the middle portion of the link 12 when there is no load on the ends 16 and 18 of the link. In particular, the nut member 84 is tightened so that with no load on the link the load cell 20 is firmly positioned across the middle portion of the link and with the meter 42 providing for a reading representative of a zero load on the link 20.

When a load is applied to the ends 16 and 18 of the link 12, this load produces a stretching of the elongated middle portion of the link as well as a bending of the elongated portions of the link around the end portions 16 and 18. The link would be used within an elastic range wherein forces applied to the link provide for stretching and bending which are directly responsive to the application of a load an with the link returning to its initial configuration upon removal of the load.

As the load is applied and the link stretches and bends around its ends, the middle portion of the link tends to close up and come together, thereby providing a force to the cantilevered members 24 and 26. This force is applied directly to the center portion 28 at one side of the load cell and through the nut 84 and the screw 78 at the other side of the load cell. As the cantilevered members 24 and 26 are forced towards each other, stress is produced in the beam members 22. Specifically, one side of each beam member is in tension while the other side is in compression which produces opposite effects in the strain gauges 32 and 36 as opposed to strain gauges 34 and 38.

The changes in the strain gauges 32 through 38 are represented in FIG. 4 by changes in the resistance value of the stain gauges. Initially with no load, the resistance value of the strain gauges 32 through 38 were all substantially the same resistance value. This provides for a balanced condition in the bridge and therefore no output reading in the meter 42. As the load is increased the resistance values of the strain gauges change, thereby providing an unbalance in the bridge. This produces an output signal which provides for a direct indication by the meter 42 of a value representative of the load on the ends 16 and 18 of the link 12.

It is to be appreciated that the actual load on the load cell 20 is a fraction of that applied to the ends 16 and 18 of the link 12, yet the load measured by the load cell 20, although an indirect measurement, is in proportion to the load applied to the ends of the link. The actual readings 44 on the meter 42 may be directly representative of the load or may be values which have been calibrated and with the actual load determined by reference to a calibrated chart.

As was previously indicated, the link 12 may be part of an existing line or may be specially inserted into a line so as to provide for the measurement of a load. Also, the link 12 may be specifically designed to operate with the load cell 20 and in such a case the link may be provided with accurate surfaces so as to eliminate the need of the coupling members 50 and 52. As shown in FIG. 3, the load cell 20 also includes cover members 86 and 88 so as to shield and protect the interior of the load cell. It is noted, however, that these cover members are attached by screws 90 and 92 only at one end of the load cell 20 so as to allow for the proper movement of the interior members of the load cell to provide for the measurement of loads.

Although the invention has been described with reference to a particular embodiment, it is to be appreciated that various adaptations and modifications may be made and the invention is only to be limited by the appended claims.

I claim:

1. A load measuring device for use in situ with an existing link in a load bearing line and with the link formed as an oval loop and with the link having end portions along a first long axis of the link for receiving a load on the link along the first long axis, including a load cell for mounting across a second short axis of the link and within the loop and with the second short axis substantially perpendicular to the first long axis for providing an indirect measurement of the load on the link along the first long axis in accordance with the force on the load cell along the second short axis, coupling means for mounting on opposite portions of the link and with the load cell mounted between the coupling means and with the coupling means transmitting the force to the load cell along the second short axis from the link and for providing a secure mounting of the load cell across the link, the load cell including means responsive to the force on the load cell along the second short axis for producing an output signal in accordance with the force on the load cell, the load cell including at least one cantilever portion and at least one beam portion and with the cantilever portion responsive to the force on the load cell for producing a stress in the beam portion and with the means included in the load cell responsive to the stress in the beam portion, and indicator means responsive to the output signal from the means included in the load cell for providing an output indication representative of the load on the link along the first long axis.

2. The load measuring device of claim 1 wherein the means included in the load cell includes at least one strain gauge responsive to the strain on a portion of the load cell in accordance with the force on that portion of the load cell.

3. A load measuring device for use in situ with an existing link in a load bearing line and with the link formed as an oval loop and with the link having end portions along a first long axis of the link for receiving a load on the link along the first long axis, including a load cell for mounting across a second short axis of the link and within the loop and with the second short axis substantially perpendicular to the first long axis for providing an indirect measurement of the load on the link along the first long axis in accordance with the force on the load cell along the second short axis, coupling means for mounting on opposite portions of the link and with the load cell mounted between the coupling means and with the coupling means transmitting the force to the load cell along the second short axis from the link and for providing a secure mounting of the load cell across the link, the coupling means and the load cell including complementary locating means for controlling the positioning of the load cell across the link.

a the load cell including means responsive to the force on the load cell along the second short axis for producing an output signal in accordance with the force on the load cell, and indicator means responsive to the output signal from the means included in the load cell for providing an output indication representative of the load on the link along the first long axis.

4. The load measuring device of claim 3 wherein the outside surface of the link has a particular configuration and wherein the coupling means includes a configuration for the inside surface which is complementary to the configuration of the outside surface of the link.

5. The load measuring device of claim 3 wherein the load cell includes an adjustment means for adjusting the mounting distance across the link with no load on the link.

6. A load measuring device for use in situ with an existing link in a load bearing line, including an oval link formed as a loop and with the link having end portions along a first long axis, means for coupling to the end portions of the link for providing a load on the link along the first long axis, load measurement means for mounting across a second short axis of the link and within the loop and with the second short axis substantially perpendicular to the first long axis for providing an indirect measurement of the load on the link along the first long axis in accordance with the load on the load measurement means along the second short axis and with the load measurement means producing an output signal in accordance with the load on the load measurement means, coupling means for mounting on opposite portions of the link and with the load measurement means mounted between the coupling means and with the coupling means transmitting the load to the load measurement means along the second short axis from the link and for providing a secure mounting of the load measurement means across the link, load measurement means including at least one cantilever portion and at least one beam portion and with the cantilever portion responsive to the load on the load measurement means for producing a stress in the beam portion and additionally including means responsive to the stress in the beam portion, and indicator means responsive to the output signal from the load measurement means for producing an output indication representative of the load on the link along the first axis.

7. The load measuring device of claim 6 wherein the load measurement means includes at least one strain gauge responsive to the strain on a portion of the load measurement means.

8. A load measuring device for use in situ with an existing link in a load bearing line, including an oval link formed as a loop and with the link having end portions along a first long axis, means for coupling to the end portions of the link for providing a load on the link along the first long axis, load measurement means for mounting across a second short axis of the link and within the loop and with the second short axis substantially perpendicular to the first long axis for providing an indirect measurement of the load on the link along the first long axis in accordance with the load on the load measurement means along the second short axis and with the load measurement means producing an output signal in accordance with the load on the load measurement means, coupling means for mounting on opposite portions of the link and with the load measurement means mounted between the coupling means and with the coupling means transmitting the load to the load measurement means along the second short axis from the link and for providing a secure mounting of the load measurement means across the link, the coupling means and the load measurement means including complementary locating means for controlling the positioning of the load measurement means across the link, and indicator means responsive to the output signal from the load measurement means for producing an output indication representative of the load on the link along the first axis.

9. The load measuring device of claim 8, wherein the outside surface of the link has a particular configuration and wherein the coupling means include a configuration for the inside surface which is complementary to the outside surface of the link.

10. The load measuring device of claim 8 wherein the load measurement means includes an adjustment means for adjusting the mounting distance across the link with no load on the link.

* * * * *